(12) United States Patent
Jain et al.

(10) Patent No.: US 9,819,511 B2
(45) Date of Patent: Nov. 14, 2017

(54) BIDIRECTIONAL FORWARDING DETECTION OVER A VIRTUAL EXTENSIBLE LOCAL AREA NETWORK

(71) Applicant: Alcatel Lucent, Boulogne-Billancourt (FR)

(72) Inventors: Pradeep G. Jain, Sunnyvale, CA (US); Kanwar D. Singh, Sunnyvale, CA (US)

(73) Assignee: Alcatel Lucent, Boulogne-Billancourt (FR)

( * ) Notice: Subject to any disclaimer, the term of this patent is extended or adjusted under 35 U.S.C. 154(b) by 386 days.

(21) Appl. No.: 14/598,978

(22) Filed: Jan. 16, 2015

(65) Prior Publication Data

US 2016/0211989 A1    Jul. 21, 2016

(51) Int. Cl.
*H04L 12/46* (2006.01)
*H04L 12/24* (2006.01)
*H04L 12/26* (2006.01)

(52) U.S. Cl.
CPC ...... *H04L 12/4633* (2013.01); *H04L 12/4641* (2013.01); *H04L 41/06* (2013.01); *H04L 43/0811* (2013.01); *H04L 43/10* (2013.01)

(58) Field of Classification Search
CPC . H04L 45/74; H04L 12/4633; H04L 12/4641; H04L 41/06; H04L 43/0811; H04L 43/10
See application file for complete search history.

(56) References Cited

U.S. PATENT DOCUMENTS

| | | |
|---|---|---|
| 7,940,695 B1 | 5/2011 | Bahadur et al. |
| 8,504,818 B2 | 8/2013 | Rao et al. |
| 8,510,474 B2 | 8/2013 | Van Aken et al. |
| 8,510,549 B2 | 8/2013 | Rossi et al. |
| 2002/0049856 A1 | 4/2002 | Hujber |
| 2005/0071494 A1 | 3/2005 | Rundquist et al. |
| 2008/0279110 A1 | 11/2008 | Hart et al. |
| 2011/0170426 A1 | 7/2011 | Kompella et al. |
| 2011/0286324 A1 | 11/2011 | Bellagamba et al. |

(Continued)

FOREIGN PATENT DOCUMENTS

WO    2014189709 A1    11/2014

OTHER PUBLICATIONS

International Search Report and Written Opinion dated Mar. 30, 2016, in connection with International Patent Application No. PCT/US16/12969, 14 pgs.

(Continued)

*Primary Examiner* — Melvin Marcelo
(74) *Attorney, Agent, or Firm* — Chiesa Shahinian & Giantomasi, PC

(57) ABSTRACT

A system and method for detecting a communication status includes generating, at an originating virtual tunnel end point (VTEP), a virtual extensible local area network (VX-LAN) data packet in accordance with VXLAN protocols. A bidirectional forwarding detection (BFD) data packet is encapsulated in the VXLAN data packet to provide a VXLAN BFD data packet. The VXLAN BFD data packet is transmitted to a terminating VTEP to establish a BFD session over a VXLAN tunnel. A communication status of the VXLAN tunnel is determined for the BFD session based on a reply BFD data packet received from the terminating VTEP in accordance with a receiving time interval.

18 Claims, 6 Drawing Sheets

(56) References Cited

U.S. PATENT DOCUMENTS

| | | | |
|---|---|---|---|
| 2012/0036279 A1* | 2/2012 | Boutros | H04L 43/0811 709/238 |
| 2014/0075243 A1 | 3/2014 | Nagaraj | |
| 2015/0195178 A1* | 7/2015 | Bhattacharya | H04L 45/745 718/1 |
| 2016/0197853 A1* | 7/2016 | Kumar | H04L 45/02 370/389 |

OTHER PUBLICATIONS

International Search Report and Written Opinion dated Apr. 8, 2016, in connection with International Patent Application No. PCT/US16/12989, 14 pgs.
"Network Functions Virtualisation (NFV); Infrastructure; Network Domain," Group Specification, European Telecommunication Standards Institute (ETSI), vol. NFV INF, No. V1.1.1, Dec. 1, 2014, pp. 26-36.
Katz et al., "Bidirectional Frowarding Detection (BFD)," Internet Engineering Task Force; Internet Society 4, Jun. 1, 2010, pp. 1-49.
Luyuan et al, "BGP IP MLS VPN Virtual CE," Internet Engineering Task Force; Internet Society 4, Jul. 5, 2014, pp. 1-21.
Kompella, K. et al., "Detecting Multi-Protocol Label Switched (MPLS) Data Plane Failures," Feb. 1, 2006, XP015044811, ISSN: 0000-0003, 50 pgs.
Sridharan, A. et al., "NVGRE: Network Virtualization using Generic Routing Encapsulation," Feb. 25, 2013, Internet Engineering Task Force, pp. 1-17.
Jain, K., "Generic Overlay OAM and Datapath Failure Detection," Internet Engineering Task Force, Feb. 12, 2014, pp. 1-44.
International Search Report and Written Opinion dated Aug. 12, 2014, in connection with international PCT application No. PCT/US2014/037868, 14 pgs.
International Search Report and Written Opinion dated Aug. 14, 2014, in connection with international PCT application No. PCT/US2014/037792, 14 pgs.
Farinacci, D. et al., "Generic Routing Encapsulation (GRE)," Mar. 1, 2000, ISSN: 0000-0003, 10 pgs.
Mahalingam, D. et al., "VXLAN: A Framework for Overlaying Virtualized Layer 2 Networks Over Layer 3 Networks," May 8, 2013, Internet Engineering Task Force, pp. 1-22.
Young, X Xu Huawei, "NVGRE and VXLAN Encapsulation for L3VPN Extension," May 21, 2013, Internet Engineering Task Force, pp. 1-7.
Aggarwal, Rahul et al., "OAM Mechanisms in MPLS Layer 2 Transport Networks," Oct. 1, 2004, IEEE Communications Magazine, vol. 42, No. 10, ISSN: 0163-6804, pp. 124-130.
Harrison, Neil et al., "OAM Functionality for MPLS Networks," Feb. 1, 2001, ISSN: 0000-0004, 29 pgs.
Singh, P., "VXLAN Router Alert Option," Internet Engineering Task Force, Mar. 3, 2014, pp. 1-12.
International Search Report and Written Opinion dated Aug. 18, 2014, in connection with international PCT application No. PCT/US2014/038474, 14 pgs.
International Search Report and Written Opinion dated Sep. 2, 2014, in connection with international PCT application No. PCT/US2014/038548, 13 pgs.
Jain, K. et al., "Detecting VXLAN Segment Failure," Jun. 8, 2013, Internet Engineering Task Force, XP015090668, pp. 1-20.

* cited by examiner

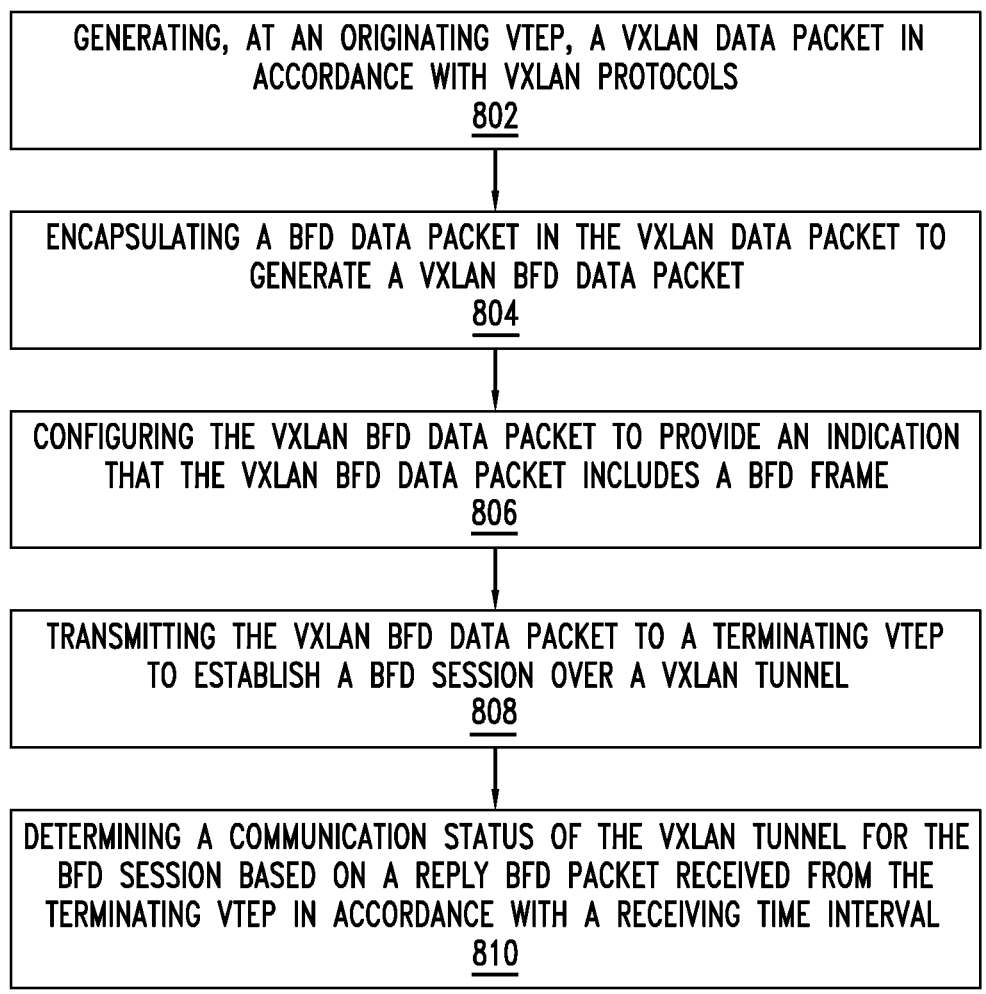

RECEIVING A VXLAN BFD DATA PACKET FROM AN ORIGINATING VTEP TO ESTABLISH A BFD SESSION OVER A VXLAN TUNNEL
902

IDENTIFYING THE VXLAN BFD DATA PACKET AS INCLUDING A BFD FRAME TO ESTABLISH A BFD SESSION OVER THE VXLAN TUNNEL
904

DETERMINING A COMMUNICATION STATUS OF THE VXLAN TUNNEL BASED ON AN INITIAL BFD DATA PACKET RECEIVED FROM THE ORIGINATING VTEP IN ACCORDANCE WITH A RECEIVING TIME INTERVAL
906

FIG. 10

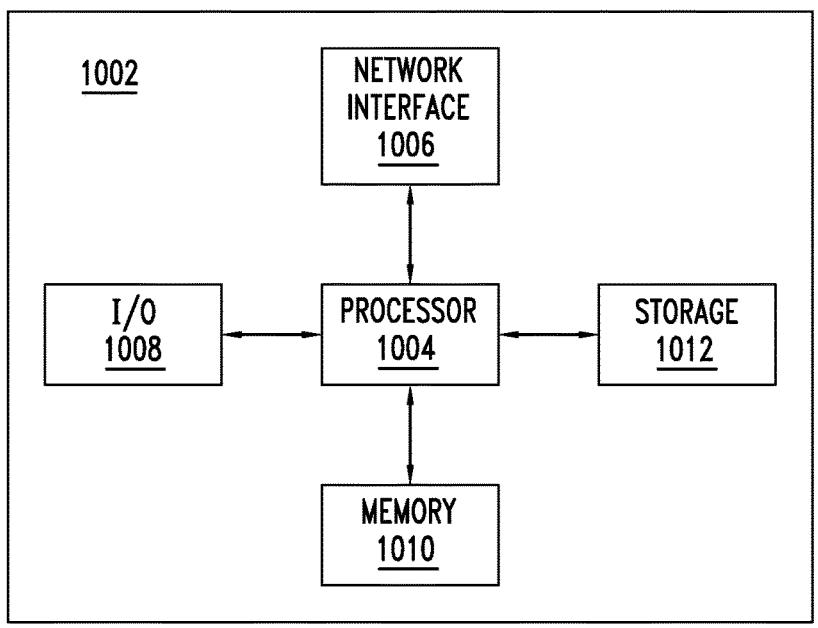

BIDIRECTIONAL FORWARDING DETECTION OVER A VIRTUAL EXTENSIBLE LOCAL AREA NETWORK

BACKGROUND OF THE INVENTION

The present invention relates generally to the detection of communication failures and more particularly to bidirectional forwarding detection for detecting network communication failures over a virtual extensible local area network.

A virtual extensible local area network (VXLAN) is a network virtualization technology adapted to ameliorate scalability problems associated with large cloud computing deployments. VXLANs use an encapsulation technique similar to that used by virtual local area networks (VLANs) to encapsulate media access control (MAC) based layer 2 Ethernet frames within layer 3 packets. In accordance with a VXLAN tunneling mechanism, a first device, referred to as an originating virtual tunnel end point, encapsulates a data packet in accordance with VXLAN protocols, and transmits the encapsulated data packet to a second device, referred to as the terminating virtual tunnel end point. The terminating virtual tunnel end point decapsulates the data packet and forwards the decapsulated data packet to an intended destination device.

An increasingly important feature of network management is the rapid detection of communication failures between adjacent systems in order to more quickly establish alternative paths. Bidirectional forwarding detection (BFD) is a common method used in networking equipment for rapid fault detection. However, there is currently no mechanism for supporting BFD to detect failures between end points in VXLAN tunneling.

BRIEF SUMMARY OF THE INVENTION

In one embodiment, systems and methods for detecting a communication status at an originating virtual tunnel end point (VTEP) include generating, at the originating VTEP, a virtual extensible local area network (VXLAN) data packet in accordance with VXLAN protocols. A Bidirectional forwarding detection (BFD) data packet is encapsulated in the VXLAN data packet to generate a VXLAN BFD data packet. The VXLAN BFD data packet is transmitted to a terminating VTEP to establish a BFD session over a VXLAN tunnel. A communication status of the VXLAN tunnel is determined for the BFD session based on a reply BFD data packet received from the terminating VTEP in accordance with a receiving time interval.

In one embodiment, the VXLAN BFD data packet may be configured to provide an indication that the VXLAN BFD data packet includes a BFD frame. The indication may be provided by setting a router alert option in an outer VXLAN header of the VXLAN data packet and by setting a destination media access control (MAC) address in an inner Ethernet header of the VXLAN BFD data packet to a predetermined value.

The communication status of the VXLAN tunnel may be determined based on not receiving the reply BFD data packet from the terminating VTEP within the receiving time interval. The communication status of the VXLAN tunnel may be determined to be down when a particular number of reply BFD data packets are not received within their respective receiving time interval. The originating VTEP may send initial BFD data packets to the terminating VTEP based on a transmission time interval.

Establishing the BFD session over the VXLAN tunnel may further include receiving a responding BFD data packet from the terminating VTEP. The responding BFD data packet may have a your discriminator field in a BFD header set to a value equal to a my discriminator field in a BFD header of the VXLAN BFD data packet. The receiving time intervals may be negotiated based on a value set in a required minimum receiving interval field of the VXLAN BFD data packet and a value set in a required minimum receiving interval field of the responding BFD data packet.

In another embodiment, systems and methods for detecting communication failures at a terminating VTEP include receiving a VXLAN BFD data packet from an originating VTEP to establish a BFD session over a VXLAN tunnel. The VXLAN BFD data packet comprises a VXLAN data packet in accordance with VXLAN protocols encapsulating a BFD data packet. A communication status of the VXLAN tunnel is determined based on an initial BFD data packet received from the originating VTEP in accordance with a receiving time interval.

These and other advantages of the invention will be apparent to those of ordinary skill in the art by reference to the following detailed description and the accompanying drawings.

BRIEF DESCRIPTION OF THE DRAWINGS

FIG. 8 shows a flow diagram of a method for detecting communication failures at an originating VTEP;

FIG. 9 shows a flow diagram of method for detecting communication failures at a terminating VTEP; and FIG. 10 shows components of an exemplary computer that may be used for detecting communication failures.

DETAILED DESCRIPTION

Figure 1:
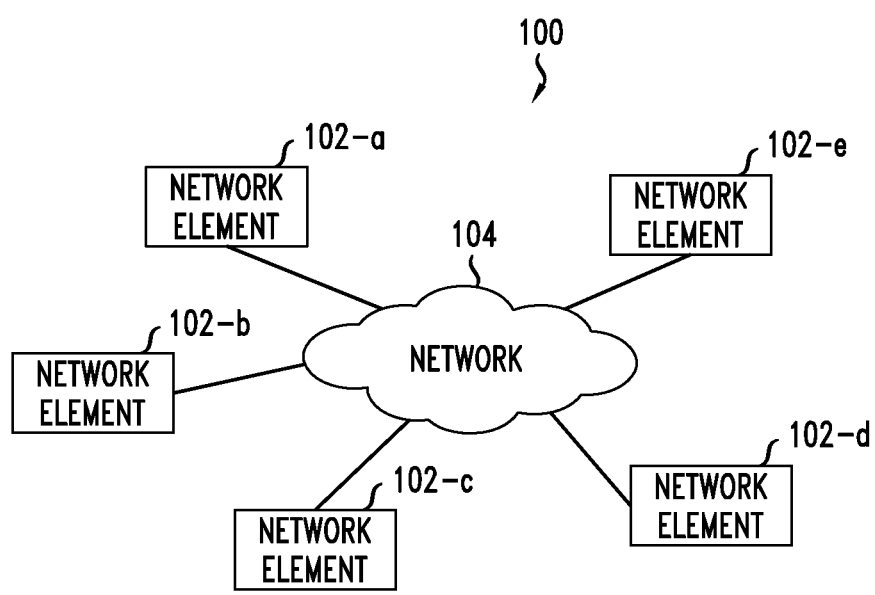
FIG. 1 shows a high-level overview of a communications system.

FIG. 1 shows a high-level overview of a communications system 100, in accordance with one or more embodiments. Communications system 100 includes network element 102-a, 102-b, 102-c, 102-d, 102-e, etc. (collectively referred to as network element 102) communicatively coupled to network 104. Network element 102 may include any type of device capable of communicating over network 104. For example, network element 102 may be a server computer, such as, e.g., an email server, a database server, a virtual machine, a software application, etc. In another example, network element 102 may be a router. It should be understood that communications system 100 may include any number of network elements 102 and that network element 102 may refer to any one of the network elements.

Network elements 102 communicate over network 104. Network 104 may include any type of network or combinations of different types of networks. For example, network 104 may include the Internet, an intranet, a local area network (LAN), a wide area network (WAN), a wired and/or wireless network, a Fibre Channel storage area network (SAN), a cellular communications network, etc. Other types of networks are also contemplated.

In one embodiment, two or more network elements 102 within network 104 communicate using virtual extensible local area network (VXLAN). VXLAN employs an encapsulation technique to encapsulate media access control (MAC) based layer-2 Ethernet frames within layer 3 packets. In accordance with a VXLAN tunneling mechanism, an originating virtual tunnel end point (VTEP), such as, e.g., network element 102-a, encapsulates a data packet in accordance with VXLAN protocols, and transmits the encapsulated data packet to a terminating VTEP, such as, e.g., network elements 102-b. The terminating VTEP decapsulates the data packet and forwards the decapsulated data packet to an intended destination device.

Figure 2:
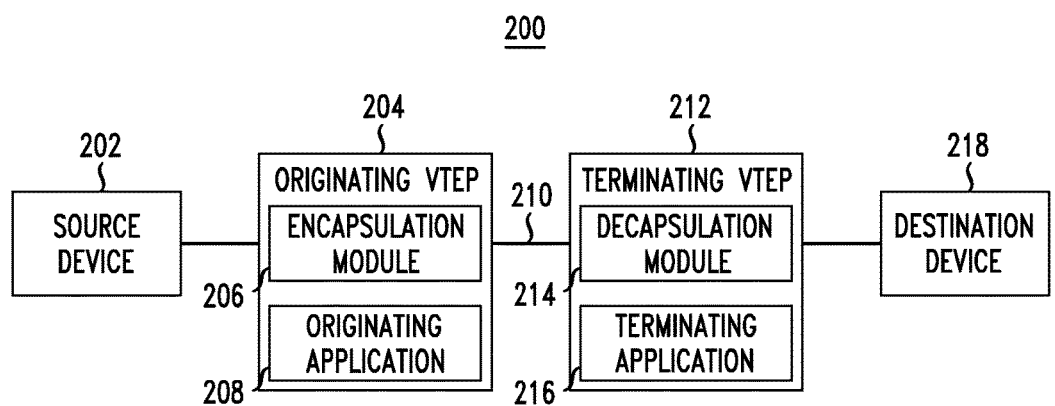
FIG. 2 shows a system for communicating between an originating and terminating virtual tunnel end point.

FIG. 2 shows a system 200 for implementing VXLAN, in accordance with one or more embodiments. System 200 includes source device 202, originating VTEP 204, terminating VTEP 212, and destination device 218, each of which may be represented by network elements 102 in communications system 100.

Originating VTEP 204 comprises encapsulation module 206 and originating application 208. Encapsulation module 206 is configured to encapsulate a data packet in accordance with VXLAN protocols and transmit the VXLAN packet via link 210 to terminating VTEP 212 for destination device 218. Link 210 may include a network connection, a direct connection, etc. In one embodiment, the data packet includes a bidirectional forwarding detection (BFD) data packet. However the data packet may also include any other type of data packet, such as, e.g., an Internet Protocol (IP) data packet. In one example, the data packet is generated by source device 202. In another example, the data packet is generated by originating application 208.

Originating application 208 may include any type of application having any type of functionality. In one embodiment, originating application 208 may be a BFD task for network fault detection, which creates the BFD data packet and provides it to encapsulation module 206. Other types of originating application 208 are also contemplated, such as, e.g., an operations, administration, and maintenance (OAM) application.

The data packet may be encapsulated by encapsulation module 206 in accordance with VXLAN protocols to provide a VXLAN data packet. The VXLAN data packet is transmitted via link 210 to terminating VTEP 202. Terminating VTEP 212 comprises decapsulation module 214 and terminating application 216. Decapsulation module 214 is configured to decapsulate the data packet from the VXLAN data packet. In one embodiment, decapsulation module 214 transmits the decapsulated data packet to destination device 218. In another embodiment, decapsulation module 214 transmits the decapsulated data packet to terminating application 216. Terminating application 216 includes any type of application having any type of functionality. For example, terminating application 216 may include a BFD task, an OAM application, etc.

In accordance with one or more embodiments, system 200 may be configured for implementing BFD over VXLAN. Advantageously, BFD over VXLAN may provide for rapid detection of communication failures in order to more quickly establish alternative paths. To implement BFD over VXLAN, a BFD data packet is encapsulated in accordance with VXLAN protocols. The BFD data packet may be generated by source device 202 or originating application 208 (e.g., a BFD task). The BFD data packet is encapsulated in accordance with VXLAN protocols by encapsulation module 206 of originating VTEP 204 to generate a VXLAN BFD data packet.

Figure 3:
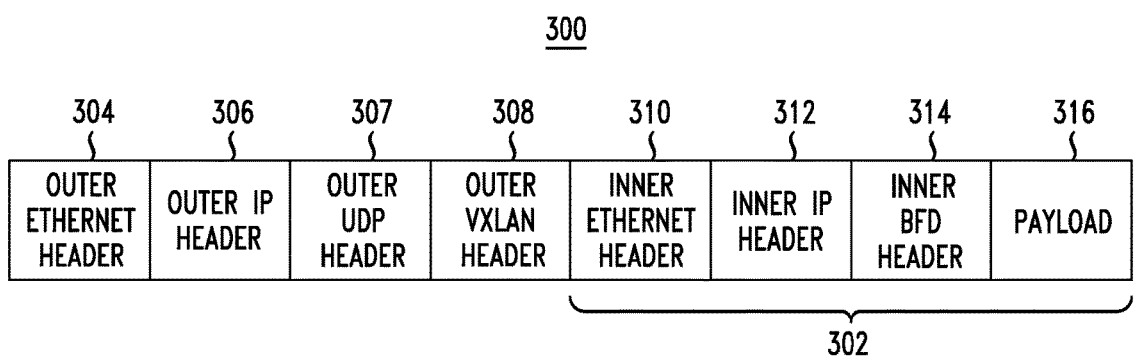
FIG. 3 shows an exemplary VXLAN BFD data packet.

FIG. 3 shows an exemplary VXLAN BFD data packet 300, in accordance with one or more embodiments. VXLAN BFD data packet 300 includes BFD data packet 302 encapsulated in accordance with VXLAN protocols. VXLAN BFD data packet 300 includes outer header portions in accordance with VXLAN protocols and inner header portions of encapsulated BFD data packet 302. Outer header portions of VXLAN BFD data packet 300 include outer Ethernet header 304, outer IP (internet protocol) header 306, outer UDP header 307, and outer VXLAN header 308. Inner header portions of VXLAN BFD data packet 300 include inner Ethernet header 310, inner IP header 312, inner BFD header 314, and optionally payload 316. BFD over VXLAN is implemented on system 200 by configuring or setting parameters of VXLAN BFD data packet 300.

Figure 4:
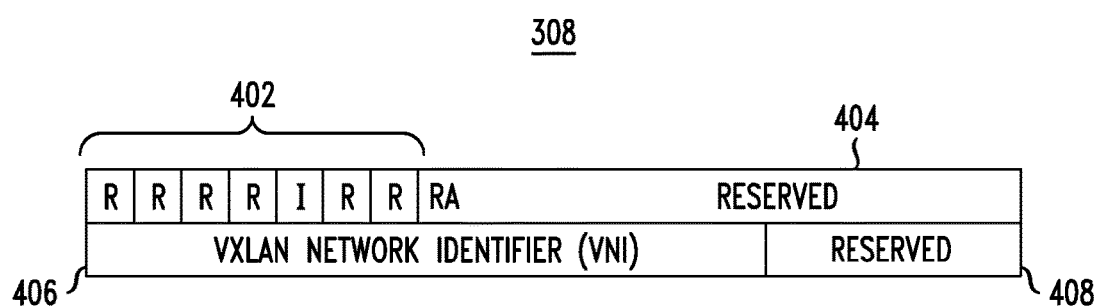
FIG. 4 shows an exemplary outer VXLAN header of the VXLAN BFD data packet.

FIG. 4 shows an exemplary outer VXLAN header 308 of VXLAN BFD data packet 300, in accordance with one or more embodiments. Outer VXLAN header 308 comprises a plurality of sections. For example, outer VXLAN header 308 may include information section 402, first reserved section 404, VXLAN network identifier (VNI) section 406, and second reserved section 408. Outer VXLAN header 308 may also include other sections.

Originating VTEP 204 configures parameters of outer VXLAN header 308 for BFD over VXLAN. VNI 406 is set to be the same as that of the VXLAN segment that is being verified. This ensures that VXLAN BFD data packet 300 travels over the same data path as any other end system data traveling over this VXLAN segment.

The VXLAN router alert option, shown as RA in outer VXLAN header 308 of FIG. 4, is also set in reserved section 404 of outer VXLAN header 308. For example, the router alert option RA may include a router alert bit, which is set by updating its value. In one example, originating VTEP 204 may set the 1 bit to, e.g., 0 in outer VXLAN header 308. An indication of the 1 bit set to 0 in VXLAN header 308 of a VXLAN BFD frame would cause terminating VTEP 212 of FIG. 2 to drop the frames where terminating VTEP 212 does not understand VXLAN BFD data packet 300. Additionally, a router alert option RA indicative of a BFD frame in VXLAN BFD data packet 300 would alert terminating VTEP 212 not to forward the VXLAN frame to destination device 218 and instead to perform local processing (e.g., BFD).

Figure 5:
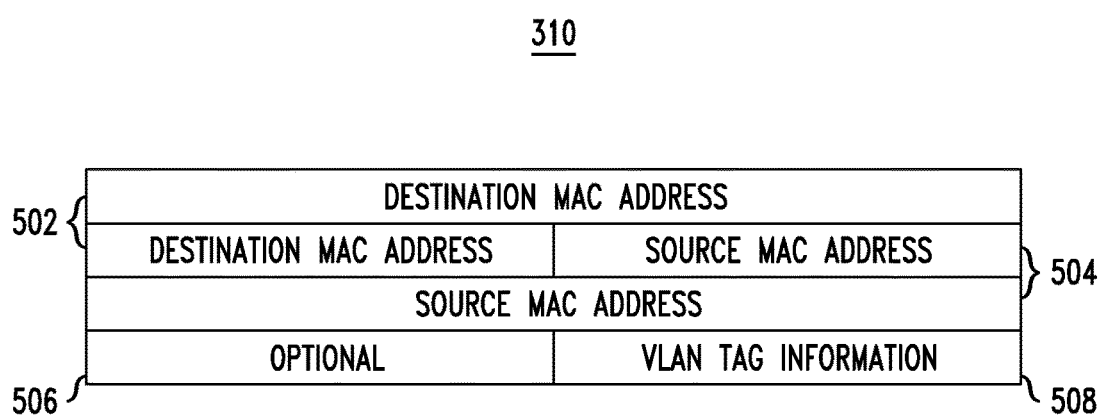
FIG. 5 shows an exemplary inner Ethernet header of the VXLAN BFD data packet.

Originating VTEP 204 also configures parameters of inner Ethernet header 310 for implementing BFD over VXLAN. FIG. 5 shows an exemplary inner Ethernet header 310 of VXLAN BFD data packet 300, in accordance with one or more embodiments. Inner Ethernet header 310 comprises a plurality of sections. For example, inner Ethernet header 310 may include destination MAC (media access control) address 502, source MAC address 504, optional section 506, and VLAN tag information section 508. Inner Ethernet header 310 may also include other sections.

Parameters of inner Ethernet header 310 are configured by setting destination MAC address 502 to a well-defined, predetermined value to indicate the payload of VXLAN BFD data packet 300 to be a BFD data packet. For example, destination MAC address 502 may be set to 00-00-5E-90-XX-XX, where X is any hexadecimal digit, e.g., a value assigned by the Internet Assigned Numbers Authority (IANA). Source MAC address 504 is also set to the MAC address of originating VTEP 204. In one embodiment, source MAC address 504 is not learned in the MAC address table as this represents VXLAN BFD. Typically, VXLAN carries layer 2/Ethernet data and a VTEP receiving the data learns the source MAC address from a MAC address table. However, since VXLAN BFD data packet 300 encapsulates a BFD control packet under a VXLAN packet, there is no need to learn source MAC address 504 from the MAC address table.

Figure 6:
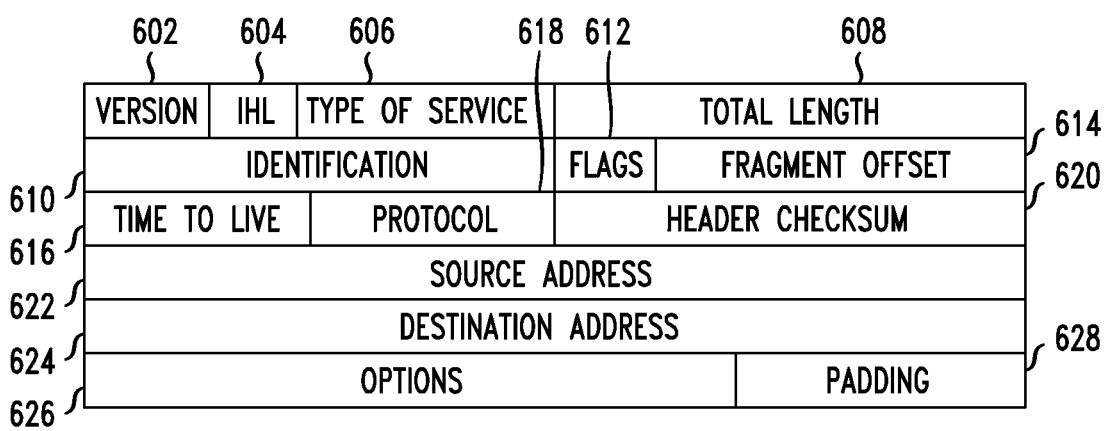
FIG. 6 shows an exemplary inner IP header of the VXLAN BFD data packet.

In addition, parameters of inner IP header 312 are configured for implementing BFD over VXLAN by originating VTEP 204. FIG. 6 shows an exemplary inner IP header 312 of VXLAN BFD data packet 300, in accordance with one or more embodiments. Inner IP header 312 in FIG. 6 is illustratively shown as an IPv4 (Internet Protocol version 4) header, however other formats are also contemplated, such as, e.g., IPv6 (Internet Protocol version 6). Inner IP header 312 comprises a plurality of sections. For example, inner IP header 312 may include version 602, IHL (internet header length) 604, type of service 606, total length 608, identification 610, flags 612, fragment offset 614, time to live 616, protocol 618, header checksum 620, source address 622, destination address 624, options 626, and padding 628. Inner IP header 312 may also include other sections.

Parameters of inner IP header 312 are configured for BFD over VXLAN by setting source address 622 to the routable address of the sender, e.g., originating VTEP 204. Destination address 624 is a, e.g., randomly chosen IPv4 address from the range 127/8 or IPv6 address from the range 0:0:0:0:0:FFFF:127/104. Time to live 616 is also set to 255.

Figure 7:
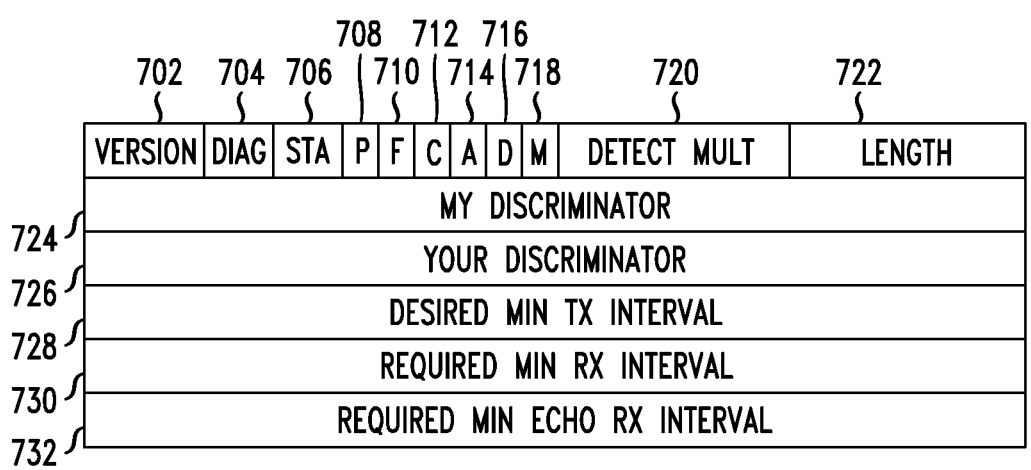
FIG. 7 shows an exemplary inner BFD header of the VXLAN BFD data packet.

Parameters of inner BFD header 314 are additionally configured for BFD over VXLAN by originating VTEP 204. FIG. 7 shows an exemplary inner BFD header 314 of VXLAN BFD data packet 300, in accordance with one or more embodiments. Inner BFD header 314 comprises a plurality of sections. For example, inner BFD header 314 may include version 702, diagnostic (diag) 704, state (sta) 706, poll (P) 708, final (F) 710, control plane independent (C) 712, authentication present (A) 714, demand (D) 716, multipoint (M) 718, detect time multiplier (Dect Mult) 720, length 722, my discriminator 724, your discriminator 726, desired minimum transmission interval 728, required minimum receiving interval 730, and required minimum echo receiving interval 732. Inner BFD header 314 may also include other sections, such as, e.g., authentication sections.

Parameters of inner BFD header 314 are configured by setting my discriminator 724 to some, e.g., random valid value (e.g., 10 or 20) and your discriminator 726 to 0. My discriminator 724 is a unique, nonzero discriminator generated by originating VTEP 204 and used to demultiplex multiple BFD sessions between a same pair of systems. Your discriminator 726 is the discriminator received from the corresponding remote system and reflects back the received value of my discriminator (or zero if the value is unknown). Timer values for desired minimum transmission interval 728 and required minimum receiving interval 730 are also set. Desired minimum transmission interval 728 is the minimum interval that originating VTEP 204 transmits VXLAN BFD data packets. Required minimum receiving interval 730 is the minimum interval between receiving BFD data packets.

VXLAN BFD data packet 300, as configured above, is used to establish a BFD session between originating VTEP 204 and terminating VTEP 212 over a VXLAN tunnel. Originating VTEP 204 transmits VXLAN BFD data packet 300 via link 210 to terminating VTEP 212. Upon receiving VXLAN BFD data packet 300, decapsulation module 214 of terminating VTEP 212 identifies VXLAN BFD data packet 300 as including a VXLAN BFD frame and decapsulates the BFD data packet 302 from VXLAN BFD data packet 300. Decapsulation module 214 identifies VXLAN BFD data packet 300 as including a VXLAN BFD frame based on the router alert in outer VXLAN header 308 and the predetermined value of destination MAC address 502 of inner Ethernet header 310. Terminating VTEP 212 configures parameters of decapsulated BFD data packet 302 by setting your discriminator 726 to the received value of my discriminator 724 from VXLAN BFD data packet 300 (as received from originating VTEP 204). Terminating VTEP 212 also sets timer values for desired minimum transmission interval 728 and required minimum receiving interval 730. Terminating VTEP 212 then transmits the configured BFD data packet 302 to originating VTEP 204 via link 210.

Upon receiving BFD data packet 302 from terminating VTEP 212, originating VTEP 204 negotiates each timer (e.g., desired minimum transmission interval 728 and required minimum receiving interval 730) to the respective slower value between initial VXLAN BFD data packet 300 from originating VTEP 204 and responding BFD data packet 302 from terminating VTEP 212 to establish the BFD session. For example, desired minimum transmission interval 728 is negotiated to be the slower value as received from initial VXLAN BFD data packet 300 (sent from originating VTEP 204 to terminating VTEP 212) and responding BFD data packet 302 (sent from terminating VTEP 212 to originating VTEP 204). In another example, required minimum receiving interval 730 is negotiated to be the slower value as received from initial VXLAN BFD data packet 300 and responding BFD data packet 302. Originating VTEP 204 and terminating VTEP 212 also associate VNI 406 to discriminator values (e.g., my discriminator 724, your discriminator 726) to identify the particular VXLAN tunnel.

Once the BFD session is established, originating VTEP 204 will periodically transmit initial BFD packets and terminating VTEP 212 will respond with reply BFD packets in accordance with the timer values. The initial BFD packets and reply BFD packets are encapsulated using VXLAN and transmitted over the VXLAN tunnel. The initial BFD packets are periodically transmitted in accordance with the negotiated desired minimum transmission interval 728. When either originating VTEP 204 or terminating VTEP 212 stop receiving the BFD packets at the agreed upon time intervals, this may be indicative of a communication failure. For example, when originating VTEP 204 does not receive a reply BFD packet from terminating VTEP 212 during an expected receiving time interval, as provided for in required minimum receiving interval 730, this may be indicative of a communication failure. In another example, when terminating VTEP 212 does not receive an initial BFD packet from originating VTEP 204 during an expected time period, as provided for in desired minimum transmission interval 728, this may be indicative of a communication failure.

In one embodiment, the VXLAN tunnel will be declared down after missing a particular number of (e.g., consecutive) BFD packets. The particular number of BFD packets missed may be the number of BFD packets missed at originating VTEP 204 and terminating VTEP 212. The particular number of missed BFD packets is based on detection time multiplier 720 of BFD header 314. Any state on originating VTEP 204 or terminating VTEP 212 that is created by virtue of the VXLAN tunnel will be removed once the VXLAN tunnel is declared down.

Advantageously, system 200 is configured to implement rapid fault detection using BFD over VXLAN tunnels. This allows system 200 to more quickly establish alternative paths.

FIG. 8 shows a flow diagram of a method 800 for detecting communication failures at an originating VTEP, in accordance with one or more embodiments. At step 802, a VXLAN data packet is generated in accordance with VXLAN protocols at an originating VTEP. At step 804, a BFD data packet is encapsulated in the VXLAN data packet at the originating VTEP to generate a VXLAN BFD data packet. The BFD data packet may be generated by a source device or by an originating application, such as, e.g., a BFD task at the originating VTEP. At step 806, the VXLAN BFD data packet is configured to indicate that the VXLAN BFD data packet includes a BFD frame. For example, the VXLAN BFD data packet may be configured to indicate a BFD frame by setting a router alert option in the outer VXLAN header of the VXLAN BFD data packet and by setting a destination MAC address in inner Ethernet header of the VXLAN BFD data packet to a well-defined, predetermined value (e.g., 00-00-5E-90-XX-XX, where X is any hexadecimal digit, e.g., a value assigned by IANA).

In one embodiment, the VXLAN BFD data packet is further configured by the originating VTEP as follows. The VNI of the outer VXLAN header of the VXLAN BFD data packet is set to the same as that of the VXLAN segment (or tunnel) that is being verified. The source MAC address in the inner Ethernet header is set to the MAC address of the originating VTEP. A source address of an inner IP header of the VXLAN BFD data packet is set to a routable address of the originating VTEP. The destination address of the inner IP header is set to a randomly chosen IPv4 address from the range 127/8 or an IPv6 address from the range 0:0:0:0:0:FFFF:127/104, and the time to live is set to 255. A my discriminator field in an inner BFD header of the VXLAN BFD data packet is set to any valid value and a your discriminator field is set to zero. A desired minimum transmitting interval and a required minimum receiving interval are also set.

At step 808, the VXLAN BFD data packet is transmitted from the originating VTEP to a terminating VTEP to establish a BFD session over a VXLAN tunnel. Terminating VTEP decapsulates the BFD data packet and sets the your discriminator field in the BFD header to the my discriminator value in the received VXLAN BFD data packet. Terminating VTEP also sets a desired minimum transmitting interval and a required minimum receiving interval. Terminating VTEP then sends the BFD data packet to originating VTEP. Timer values for the desired minimum transmitting interval and the required minimum receiving interval are each negotiated to the slower value between the value indicated by the originating VTEP and the value indicated by the terminating VTEP. The originating VTEP and the terminating VTEP also associate the VNI to the discriminator values to identify a particular VXLAN tunnel.

At step 810, a communication status of the VXLAN tunnel for the BFD session is determined by the originating VTEP based on a reply BFD packet received from the terminating VTEP in accordance with the negotiated receiving time interval. In one embodiment, when originating VTEP does not receive a BFD packet within the negotiated time for a particular number of intervals (as set in detection time multiplier field in the inner BFD header), the VXLAN tunnel is declared down. For example, if, e.g., three BFD packets each are not received within their respective receiving time interval, the VXLAN tunnel is declared down. Any state on the VTEP created by virtue of the VXLAN tunnel will be removed once the tunnel is declared down.

FIG. 9 shows a flow diagram of a method 900 for detecting communication failures by a terminating VTEP, in accordance with one or more embodiments. At step 902, a VXLAN BFD data packet is received by the terminating VTEP from an originating VTEP. The VXLAN BFD data packet comprises a VXLAN data packet generated in accordance with VXLAN protocols encapsulating a BFD data packet. The VXLAN BFD data packet may be configured as discussed above. At step 904, the terminating VTEP identifies the VXLAN BFD data packet as including a BFD frame to establish a BFD session over a VXLAN tunnel. In one embodiment, the terminating VTEP identifies the VXLAN BFD data packet as including a BFD frame based on a router alert option set in the outer VXLAN header of the VXLAN BFD data packet and a well-defined, predetermined value of the destination MAC address in the inner Ethernet header of the VXLAN BFD data packet.

At step 906, a communication status of the VXLAN tunnel is determined by the terminating VTEP for the BFD session based on an initial BFD data packet received from the originating VTEP in accordance with a receiving time interval. In one embodiment, when terminating VTEP does not receive a BFD packet within the negotiated time for a particular number of intervals (as set in detection time multiplier field in the inner BFD header), the VXLAN tunnel is declared down. Any state on the VTEP created by virtue of the VXLAN tunnel will be removed once the tunnel is declared down.

Systems, apparatuses, and methods described herein may be implemented using digital circuitry, or using one or more computers using well-known computer processors, memory units, storage devices, computer software, and other components. Typically, a computer includes a processor for executing instructions and one or more memories for storing instructions and data. A computer may also include, or be coupled to, one or more mass storage devices, such as one or more magnetic disks, internal hard disks and removable disks, magneto-optical disks, optical disks, etc.

Systems, apparatus, and methods described herein may be implemented using computers operating in a client-server relationship. Typically, in such a system, the client computers are located remotely from the server computer and interact via a network. The client-server relationship may be defined and controlled by computer programs running on the respective client and server computers.

Systems, apparatus, and methods described herein may be implemented within a network-based cloud computing system. In such a network-based cloud computing system, a server or another processor that is connected to a network communicates with one or more client computers via a network. A client computer may communicate with the server via a network browser application residing and operating on the client computer, for example. A client computer may store data on the server and access the data via the network. A client computer may transmit requests for data, or requests for online services, to the server via the network. The server may perform requested services and provide data to the client computer(s). The server may also transmit data adapted to cause a client computer to perform a specified function, e.g., to perform a calculation, to display specified data on a screen, etc. For example, the server may transmit a request adapted to cause a client computer to perform one or more of the method steps described herein, including one or more of the steps of FIGS. 8 and 9. Certain steps of the methods described herein, including one or more of the steps of FIGS. 8 and 9, may be performed by a server or by another processor in a network-based cloud-computing system. Certain steps of the methods described herein, including one or more of the steps of FIGS. 8 and 9, may be performed by a client computer in a network-based cloud computing system. The steps of the methods described herein, including one or more of the steps of FIGS. 8 and 9, may be performed by a server and/or by a client computer in a network-based cloud computing system, in any combination.

Systems, apparatus, and methods described herein may be implemented using a computer program product tangibly embodied in an information carrier, e.g., in a non-transitory machine-readable storage device, for execution by a programmable processor; and the method steps described herein, including one or more of the steps of FIGS. 8 and 9, may be implemented using one or more computer programs that are executable by such a processor. A computer program is a set of computer program instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

A high-level block diagram 1000 of an example computer that may be used to implement systems, apparatus, and methods described herein is depicted in FIG. 10. Computer 1002 includes a processor 1004 operatively coupled to a data storage device 1012 and a memory 1010. Processor 1004 controls the overall operation of computer 1002 by executing computer program instructions that define such operations. The computer program instructions may be stored in data storage device 1012, or other computer readable medium, and loaded into memory 1010 when execution of the computer program instructions is desired. Thus, the method steps of FIGS. 8 and 9 can be defined by the computer program instructions stored in memory 1010 and/or data storage device 1012 and controlled by processor 1004 executing the computer program instructions. For example, the computer program instructions can be implemented as computer executable code programmed by one skilled in the art to perform the method steps of FIGS. 8 and 9. Accordingly, by executing the computer program instructions, the processor 1004 executes the method steps of FIGS. 8 and 9. Computer 1002 may also include one or more network interfaces 1006 for communicating with other devices via a network. Computer 1002 may also include one or more input/output devices 1008 that enable user interaction with computer 1002 (e.g., display, keyboard, mouse, speakers, buttons, etc.).

Processor 1004 may include both general and special purpose microprocessors, and may be the sole processor or one of multiple processors of computer 1002. Processor 1004 may include one or more central processing units (CPUs), for example. Processor 1004, data storage device 1012, and/or memory 1010 may include, be supplemented by, or incorporated in, one or more application-specific integrated circuits (ASICs) and/or one or more field programmable gate arrays (FPGAs).

Data storage device 1012 and memory 1010 each include a tangible non-transitory computer readable storage medium. Data storage device 1012, and memory 1010, may each include high-speed random access memory, such as dynamic random access memory (DRAM), static random access memory (SRAM), double data rate synchronous dynamic random access memory (DDR RAM), or other random access solid state memory devices, and may include non-volatile memory, such as one or more magnetic disk storage devices such as internal hard disks and removable disks, magneto-optical disk storage devices, optical disk storage devices, flash memory devices, semiconductor memory devices, such as erasable programmable read-only memory (EPROM), electrically erasable programmable read-only memory (EEPROM), compact disc read-only memory (CD-ROM), digital versatile disc read-only memory (DVD-ROM) disks, or other non-volatile solid state storage devices.

Input/output devices 1008 may include peripherals, such as a printer, scanner, display screen, etc. For example, input/output devices 1008 may include a display device such as a cathode ray tube (CRT) or liquid crystal display (LCD) monitor for displaying information to the user, a keyboard, and a pointing device such as a mouse or a trackball by which the user can provide input to computer 1002.

Any or all of the systems and apparatus discussed herein, including elements of communications system 100 of FIG. 1 and system 200 of FIG. 2, may be implemented using one or more computers such as computer 1002.

One skilled in the art will recognize that an implementation of an actual computer or computer system may have other structures and may contain other components as well, and that FIG. 10 is a high level representation of some of the components of such a computer for illustrative purposes.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. A method, comprising:

generating, at an originating virtual tunnel end point (VTEP), a virtual extensible local area network (VXLAN) data packet in accordance with VXLAN protocols;

encapsulating a Bidirectional Forwarding Detection (BFD) data packet in the VXLAN data packet to generate a VXLAN BFD data packet;

setting a destination media access control (MAC) address in a header of the VXLAN BFD data packet to a predetermined value to indicate that a payload of the VXLAN BFD data packet is the BFD data packet;

transmitting the VXLAN BFD data packet to a terminating VTEP to establish a BFD session over a VXLAN tunnel; and determining a communication status of the VXLAN tunnel for the BFD session based on a reply BFD data packet received from the terminating VTEP in accordance with a receiving time interval.

2. The method as recited in claim 1, further comprising:

setting a router alert option in an outer VXLAN header of the VXLAN BFD data packet to indicate that the payload of the VXLAN BFD data packet is the BFD data packet.

3. The method as recited in claim 1, wherein determining the communication status of the VXLAN tunnel further comprises:

determining the communication status of the VXLAN tunnel based on not receiving the reply BFD data packet from the terminating VTEP within the receiving time interval.

4. The method as recited in claim 1, wherein determining the communication status of the VXLAN tunnel further comprises:
determining the communication status of the VXLAN tunnel to be down when a particular number of reply BFD data packets are not received within their respective receiving time interval.

5. The method as recited in claim 1, wherein determining the communication status of the VXLAN tunnel further comprises:
sending initial BFD data packets to the terminating VTEP based on a transmission time interval.

6. The method as recited in claim 1, wherein transmitting the VXLAN BFD data packet to the terminating VTEP to establish the BFD session over the VXLAN tunnel further comprises:
receiving the reply BFD data packet from the terminating VTEP, the reply BFD data packet having a your discriminator field in a BFD header set to a value equal to a my discriminator field in a BFD header of the VXLAN BFD data packet; and
negotiating the receiving time interval based on a value set in a required minimum receiving interval field of the VXLAN BFD data packet and a value set in a required minimum receiving interval field of the reply BFD data packet.

7. A method, comprising:
receiving, at a terminating virtual tunnel end point (VTEP), a virtual extensible local area network (VXLAN) bidirectional forwarding detection (BFD) data packet from an originating VTEP to establish a BFD session over a VXLAN tunnel, the VXLAN BFD data packet comprising a VXLAN data packet in accordance with VXLAN protocols encapsulating a BFD data packet;
identifying the VXLAN BFD data packet as including the BFD data packet based on a predetermined value set for a destination media access control (MAC) address in a header of the VXLAN BFD data packet; and
determining a communication status of the VXLAN tunnel for the BFD session based on an initial BFD data packet received from the originating VTEP in accordance with a receiving time interval.

8. The method as recited in claim 7, further comprising:
identifying the VXLAN BFD data packet as including the BFD data packet based on a router alert option set in an outer VXLAN header of the VXLAN BFD data packet.

9. The method as recited in claim 7, wherein determining the communication status of the VXLAN tunnel further comprises:
determining the communication status of the VXLAN tunnel based on not receiving the initial BFD data packet from the originating VTEP within the receiving time interval.

10. The method as recited in claim 7, wherein determining the communication status of the VXLAN tunnel further comprises:
determining the communication status of the VXLAN tunnel to be down when a particular number of initial BFD data packets are not received within their respective receiving time interval.

11. The method as recited in claim 7, wherein determining the communication status of the VXLAN tunnel further comprises:
sending reply BFD data packets to the origination VTEP based on a transmission time interval.

12. The method as recited in claim 7, wherein receiving, at the terminating VTEP, the VXLAN BFD data packet from the originating VTEP to establish the BFD session over the VXLAN tunnel further comprises:
sending the reply BFD data packet to the originating VTEP, the reply BFD data packet having a your discriminator field in a BFD header set to a value equal to a my discriminator field in a BFD header of the VXLAN BFD data packet; and
negotiating the receiving time interval based on a value set in a required minimum receiving interval field of the VXLAN BFD data packet and a value set in a required minimum receiving interval field of the reply BFD data packet.

13. A computer readable medium storing computer program instructions which, when executed on a processor, cause the processor to perform operations comprising:
generating, at an originating virtual tunnel end point (VTEP), a virtual extensible local area network (VXLAN) data packet in accordance with VXLAN protocols;
encapsulating a bidirectional forwarding detection (BFD) data packet in the VXLAN data packet to generate a VXLAN BFD data packet;
setting a destination media access control (MAC) address in a header of the VXLAN BFD data packet to a predetermined value to indicate that a payload of the VXLAN BFD data packet is the BFD data packet;
transmitting the VXLAN BFD data packet to a terminating VTEP to establish a BFD session over a VXLAN tunnel; and
determining a communication status of the VXLAN tunnel for the BFD session based on a reply BFD data packet received from the terminating VTEP in accordance with a receiving time interval.

14. The computer readable medium as recited in claim 13, the operations further comprising:
setting a router alert option in an outer VXLAN header of the VXLAN BFD data packet to indicate that the payload of the VXLAN BFD data packet is the BFD data packet.

15. The computer readable medium as recited in claim 13, wherein determining the communication status of the VXLAN tunnel further comprises:
determining the communication status of the VXLAN tunnel based on not receiving the reply BFD data packet from the terminating VTEP within the receiving time interval.

16. The computer readable medium as recited in claim 13, wherein determining the communication status of the VXLAN tunnel further comprises:
determining the communication status of the VXLAN tunnel to be down when a particular number of reply BFD data packets are not received within their respective receiving time interval.

17. The computer readable medium as recited in claim 13, wherein determining the communication status of the VXLAN tunnel further comprises:
sending initial BFD data packets to the terminating VTEP based on a transmission time interval.

18. The computer readable medium as recited in claim 13, wherein transmitting the VXLAN BFD data packet to the terminating VTEP to establish the BFD session over the VXLAN tunnel further comprises:
  receiving the reply BFD data packet from the terminating VTEP, the reply BFD data packet having a your discriminator field in a BFD header set to a value equal to a my discriminator field in a BFD header of the VXLAN BFD data packet; and
  negotiating the receiving time interval based on a value set in a required minimum receiving interval field of the VXLAN BFD data packet and a value set in a required minimum receiving interval field of the reply BFD data packet.

* * * * *